United States Patent
Zhuang et al.

(10) Patent No.: US 12,490,010 B2
(45) Date of Patent: Dec. 2, 2025

(54) METHOD, APPARATUS AND SYSTEM FOR ADJUSTING VOLUME OF HEAD-MOUNTED DISPLAY DEVICE, AND STORAGE MEDIUM

(71) Applicant: GOERTEK INC., Shandong (CN)

(72) Inventors: Suguo Zhuang, Shandong (CN); Bin Jiang, Shandong (CN); Xiaoyu Chi, Shandong (CN)

(73) Assignee: GOERTEK INC., Weifang (CN)

( * ) Notice: Subject to any disclaimer, the term of this patent is extended or adjusted under 35 U.S.C. 154(b) by 288 days.

(21) Appl. No.: 18/251,098

(22) PCT Filed: Dec. 16, 2020

(86) PCT No.: PCT/CN2020/136670
§ 371 (c)(1),
(2) Date: Apr. 28, 2023

(87) PCT Pub. No.: WO2022/088428
PCT Pub. Date: May 5, 2022

(65) Prior Publication Data
US 2023/0388693 A1    Nov. 30, 2023

(30) Foreign Application Priority Data
Oct. 30, 2020    (CN) .................... 202011189095.8

(51) Int. Cl.
*H04R 1/10*    (2006.01)
*G02B 27/01*    (2006.01)

(52) U.S. Cl.
CPC ......... *H04R 1/1041* (2013.01); *G02B 27/017* (2013.01); *H04R 1/1083* (2013.01); *H04R 2430/01* (2013.01)

(58) Field of Classification Search
CPC .................... H04R 2430/01; G02B 27/107
(Continued)

(56) References Cited

U.S. PATENT DOCUMENTS

2009/0268921 A1* 10/2009 Tang .................... H04R 1/1041
381/74
2010/0005953 A1* 1/2010 Kemmochi .............. H03G 3/32
84/633

(Continued)

FOREIGN PATENT DOCUMENTS

| CN | 103237276 A | 8/2013 |
| CN | 105446697 A | 3/2016 |

(Continued)

OTHER PUBLICATIONS

International Search Report from International Application No. PCT/CN2020/136670 mailed Jul. 27, 2021.

*Primary Examiner* — James K Mooney
(74) *Attorney, Agent, or Firm* — Shih IP Law Group, PLLC

(57) ABSTRACT

Disclosed are a method, apparatus and system for adjusting the volume of a head-mounted display device, and a computer-readable storage medium. The method includes: picking up a sound signal at an ear entrance position of a user; acquiring an environment sound signal from the sound signal according to the sound signal and a currently played audio signal; determining an output volume target value of a head-mounted display device according to the environment sound signal; and adjusting the volume of the head-mounted display device according to the output volume target value.

15 Claims, 2 Drawing Sheets

(58) Field of Classification Search
USPC .................................................. 381/104–109
See application file for complete search history.

(56) References Cited

U.S. PATENT DOCUMENTS

| | | | |
|---|---|---|---|
| 2011/0305346 A1* | 12/2011 | Daubigny | H03G 3/02 |
| | | | 381/28 |
| 2015/0222987 A1* | 8/2015 | Angel, Jr. | G06F 16/639 |
| | | | 381/80 |
| 2016/0313973 A1 | 10/2016 | Yajima | |
| 2017/0195811 A1* | 7/2017 | Yen | H04R 29/001 |
| 2019/0066651 A1 | 2/2019 | Yang | |
| 2020/0143790 A1* | 5/2020 | Trivedi | G10K 11/17827 |
| 2020/0272411 A1 | 8/2020 | Chen et al. | |

FOREIGN PATENT DOCUMENTS

| | | |
|---|---|---|
| CN | 106604167 A | 4/2017 |
| CN | 106648527 A | 5/2017 |
| CN | 107766030 A | 3/2018 |
| CN | 109511037 A | 3/2019 |
| CN | 109765784 A | 5/2019 |
| CN | 109918039 A | 6/2019 |
| CN | 110677776 A | 1/2020 |
| CN | 111836155 A * | 10/2020 |

\* cited by examiner

METHOD, APPARATUS AND SYSTEM FOR ADJUSTING VOLUME OF HEAD-MOUNTED DISPLAY DEVICE, AND STORAGE MEDIUM

The present disclosure claims a priority to the Chinese Patent Application No. 202011189095.8, titled "METHOD, APPARATUS AND SYSTEM FOR ADJUSTING VOLUME OF HEAD-MOUNTED DISPLAY DEVICE, AND STORAGE MEDIUM" filed in China Patent Office on Oct. 30, 2020, the entire contents of which are incorporated into the present disclosure by reference.

TECHNICAL FIELD

Embodiments of the present disclosure relate to the technical field of head-mounted display devices, and in particular, to a method, apparatus and system for adjusting the volume of a head-mounted display device, and a computer-readable storage medium.

DESCRIPTION OF RELATED ART

With the development of technology, head-mounted display devices such as Virtual Reality (VR) have more and more application scenarios and application places, users can use VR or other head-mounted display devices to watch videos, listen to music, play games, etc., and there are no restrictions on the place of use, for example, they may be used at home or in public places.

When a user is in a noisy environment, the existence of environmental noise prevents the user from clearly hearing the sound content played in the VR device, and this problem exists no matter whether a loudspeaker of the VR device is used to play the sound or earphones are used to play the sound; moreover, the louder the environmental noise, the harder it is to hear the sound content played in the VR device. At this time, generally, the user may adjust the volume in two ways, one way is to exit a current game or a music or video interface, and then return to a User Interface (UI) to find a volume adjustment menu, which requires many steps and is cumbersome to use; another way is to adjust the volume by pressing a volume button, and at this time, if the user is playing a game, since a handle is on hand, it will be inconvenient to press the volume button.

SUMMARY

An embodiment of the present disclosure provides a method for adjusting the volume of a head-mounted display device, including:
  picking up a sound signal at an ear entrance position of a user;
  acquiring an environment sound signal from the sound signal according to the sound signal and a currently played audio signal;
  determining an output volume target value of a head-mounted display device according to the environment sound signal; and
  adjusting the volume of the head-mounted display device according to the output volume target value.

Optionally, determining an output volume target value of a head-mounted display device according to the environment sound signal includes:
  acquiring an average amplitude of the environment sound signal within a preset duration;
  obtaining the output volume target value according to the average amplitude and a preset relational expression, wherein:
  the preset relational expression is $\beta = b + \log_a(\alpha+1)$ wherein $\beta$ represents the output volume target value, b represents a currently played volume value of the head-mounted display device, a is a constant greater than 1, and $\alpha$ represents the average amplitude.

Optionally, $\alpha$ satisfies an accompanying sound power of the head-mounted display device.

Optionally, adjusting the volume of the head-mounted display device according to the output volume target value includes:
  adjusting the volume of the head-mounted display device to gradually change from the currently played volume value to a target volume range, the target volume range being obtained according to the output volume target value.

Optionally, adjusting the volume of the head-mounted display device is performed so that it linearly changes from the currently played volume value to the target volume range.

Optionally, the method further includes: before determining an output volume target value of a head-mounted display device according to the environment sound signal,
  determining a magnitude of the environment sound according to the environment sound signal;
  when the magnitude of the environment sound is greater than a preset value of the currently played volume value of the head-mounted display device, performing the step of determining an output volume target value of the head-mounted display device according to the environment sound signal.

An embodiment of the present disclosure provides an apparatus for adjusting the volume of a head-mounted display device, including:
  a pickup module configured to pick up a sound signal at an ear entrance position of a user;
  an extraction module configured to acquire an environment sound signal from the sound signal according to the sound signal and a currently played audio signal;
  a determination module configured to determine an output volume target value of a head-mounted display device according to the environment sound signal; and
  an adjustment module configured to adjust the volume of the head-mounted display device according to the output volume target value.

Optionally, the determination module includes:
  an acquisition unit configured to acquire an average amplitude of the environment sound signal within a preset duration;
  a calculation unit configured to obtain the output volume target value according to the average amplitude and a preset relational expression, wherein:
  the preset relational expression is $\beta = b + \log_a(\alpha+1)$, wherein $\beta$ represents the output volume target value, b represents a currently played volume value of the head-mounted display device, a is a constant greater than 1, and $\alpha$ represents the average amplitude.

An embodiment of the present disclosure provides a system for adjusting the volume of a head-mounted display device, including:
  a memory for storing a computer program; and
  a processor configured to implement steps of the method for adjusting the volume of a head-mounted display device as described above when the computer program is executed.

An embodiment of the present disclosure provides a computer-readable storage medium, wherein a computer program is stored on the computer-readable storage medium, and when the computer program is executed by a processor, steps of the method for adjusting the volume of a head-mounted display device as described above are implemented.

According to the method, apparatus and system for adjusting the volume of a head-mounted display device, and the computer-readable storage medium, by picking up a sound signal at an ear entrance position of a user, extracting an environment sound signal from the sound signal according to a currently played audio signal, determining an output volume target value of a head-mounted display device according to the environment sound signal, and then performing volume adjustment according to the output volume target value, automatic volume adjustment is realized, thereby facilitating use by users and improving the usage experience for users.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

Figure 1:
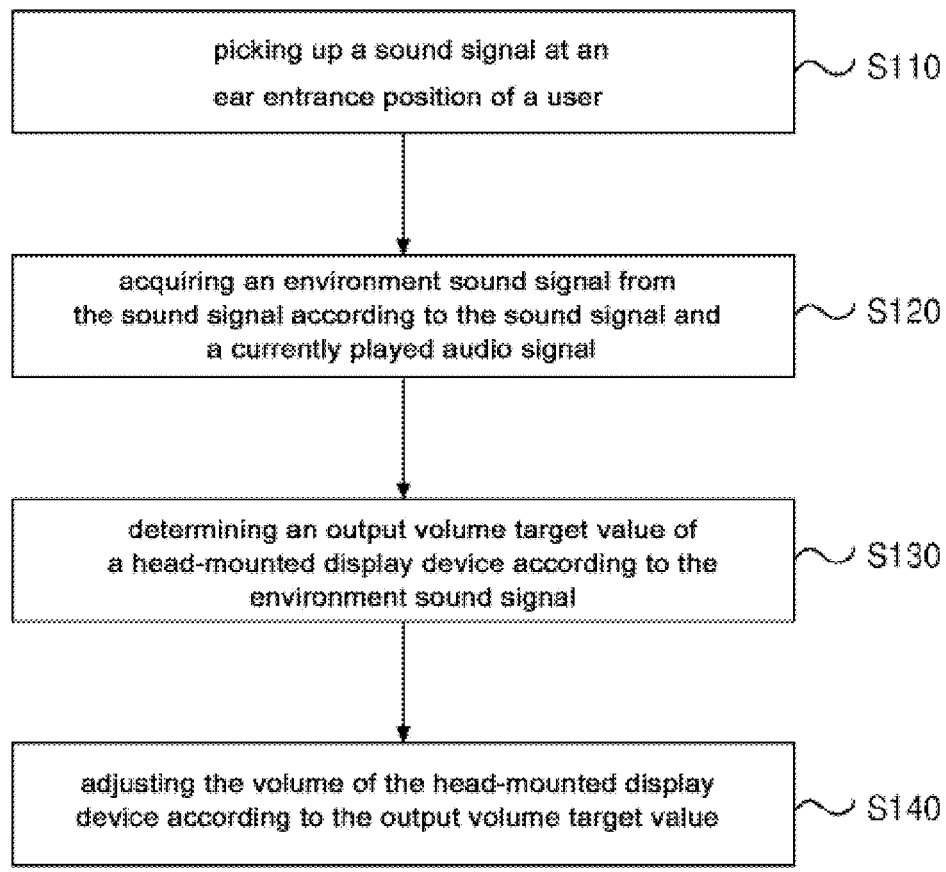
FIG. 1 is a schematic flow chart of a method for adjusting the volume of a head-mounted display device according to an embodiment of the present disclosure.

Referring to FIG. 1, FIG. 1 is a schematic flow chart of a method for adjusting the volume of a head-mounted display device according to an embodiment of the present disclosure. The method includes:

At S110, picking up a sound signal at an ear entrance position of a user.

It should be noted that in the embodiment, the sound signal at the ear entrance position of the user may be picked up after receiving an automatic adjustment instruction input by the user, wherein the user may input the automatic adjustment instruction by turning on a function switch, and when the user listens to the sound through a loudspeaker of the head-mounted display device, the sound signal at the ear entrance position of the user may be picked up by a first MIC pre-set on the head-mounted display device at a position closer to the listening position; when he user listens to the sound through earphones of the head-mounted display device, the sound signal at the ear entrance position of the user may be picked up by a second MIC disposed at a front end of the earphones.

Specifically, by detecting a current listening mode of the user, it can be determined whether the user listens to the sound through the loudspeaker or the earphones, and then a corresponding MIC can be controlled to pick up the sound signal at the ear entrance position of the user.

At S120, acquiring an environment sound signal from the sound signal according to the sound signal and a currently played audio signal.

It should be noted that after the sound signal at the ear entrance position of the user is picked up, the sound signal includes two parts, one is a sound signal transmitted to the human ear through the earphones or loudspeaker from an audio signal currently played by the head-mounted display device, and another is an environment sound signal. Therefore, the environment sound signal can be extracted from the picked up sound signal according to the audio signal currently played by the head-mounted display device.

At S130, determining an output volume target value of a head-mounted display device according to the environment sound signal.

Specifically, after the environment sound signal is extracted from the picked up sound signal, the output volume target value of the head-mounted display device is determined according to the environment sound signal, so as to adjust the volume of the head-mounted display device according to the output volume target value. That is, the output volume of the device is adjusted to close to the volume of the environment sound transmitted to the human ear, and thus it can avoid the problem that the user cannot hear the sound content played by the device due to the loud environment sound.

Further, the process of determining an output volume target value of a head-mounted display device according to the environment sound signal at S130 in the embodiment may specifically include:

acquiring an average amplitude of the environment sound signal within a preset duration;

obtaining the output volume target value according to the average amplitude and a preset relational expression, wherein:

the preset relational expression is wherein $\beta = b + \log_a(\alpha + 1)$, wherein $\beta$ represents the output volume target value, b represents a currently played volume value of the head-mounted display device, a is a constant greater than 1, and $\alpha$ represents the average amplitude.

Figure 2:
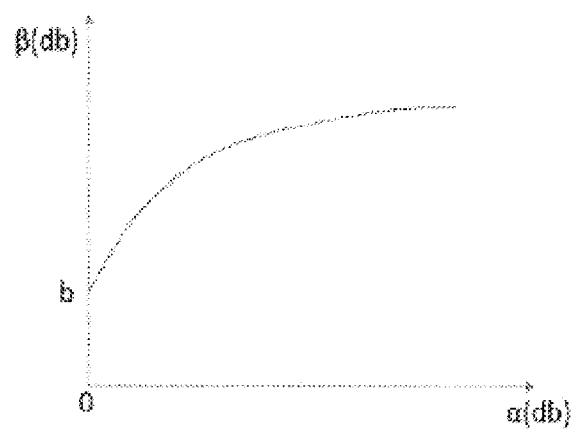
FIG. 2 is a graph showing the variation of an output volume target value $\beta$ with an average amplitude $\alpha$ according to an embodiment of the present disclosure.

Specifically, in the embodiment, the average amplitude within a preset duration can be calculated according to the extracted environment sound signal, for example, the average amplitude of the environment sound signal within a frame can be calculated. Specifically, the average amplitude may be represented by a, and then the output volume target value represented by $\beta$ can be calculated according to the average amplitude and the preset relational expression, so that the output volume target value is obtained. Here, a variation curve of the output volume target value $\beta$ in the preset relational expression is $\beta = b + \log_a(\alpha + 1)$ with the average amplitude $\alpha$ is shown in FIG. 2.

It should be noted that in the embodiment, the constant $\alpha$ is a constant greater than 1, and $\alpha$ satisfies an accompanying sound power of the head-mounted display device. That is, in practical application, the constant $\alpha$ can be set in advance according to the accompanying sound power requirement of the head-mounted display device.

Further, the method further includes: before determining an output volume target value of a head-mounted display device according to the environment sound signal,
  determining a magnitude of the environment sound according to the environment sound signal; and
  when the magnitude of the environment sound is greater than a preset value of the currently played volume value of the head-mounted display device, performing the step of determining an output volume target value of the head-mounted display device according to the environment sound signal.

Specifically, in the embodiment, before determining the output volume target value of the head-mounted display device, the magnitude of the environment sound may be determined according to the environmental sound signal, and the magnitude of the environment sound may be compared with the currently played volume value of the head-mounted display device, when the currently played volume value of the head-mounted display device is greater than the magnitude of the environment sound, and the difference is greater than a preset value, the output volume target value of the head-mounted display device may be determined the according to the environmental sound signal. That is, when the magnitude of the environment sound is greater and is higher than a preset value of the currently played volume value of the head-mounted display device, it means that the environment sound has affected the user's perception of the sound output from the device, and at this time, the volume of the head-mounted display device needs to be adjusted, and before the adjustment, the output volume target value of the head-mounted display device needs to be determined.

At S140, adjusting the volume of the head-mounted display device according to the output volume target value.

Specifically, after the output volume target value is determined, the volume of the head-mounted display device may be adjusted according to the output volume target value, so that the user can hear the sound played by the device when the played volume of the head-mounted display device reaches the human ear after adjustment and is no longer affected by the environment sound.

Further, the process of adjusting the volume of the head-mounted display device according to the output volume target value at S140 in the embodiment may specifically include:
  adjusting the volume of the head-mounted display device to gradually change from the currently played volume value to a target volume range, the target volume range being obtained according to the output volume target value.

Specifically, in the embodiment, after the output volume target value of the head-mounted display device is determined, the target volume range can be determined according to the output volume target value, that is, as long as the output volume value of the head-mounted display device is within the target range, when a played sound is transmitted to the human ear, the user can clearly hear the sound played by the device. Therefore, after the target volume range is determined, the volume of the head-mounted display device can be controlled to gradually change from the currently played volume value to the target volume range. Here, to avoid user discomfort caused by a sudden increase in the sound played by the device, the currently played volume may be gradually changed to the target volume range, and specifically, it may be gradually changed to the target volume range in a linear manner. Of course, the gradual adjustment may also be performed in a curved manner, but the specific manner can be determined according to actual situations, and the present disclosure is not limited thereto.

It can be seen that by means of picking up a sound signal at an ear entrance position of a user, extracting an environment sound signal from the sound signal according to a currently played audio signal, determining an output volume target value of a head-mounted display device according to the environment sound signal, and then performing volume adjustment according to the output volume target value, automatic volume adjustment is realized, thereby facilitating use by users and improving the usage experience for users.

Figure 3:
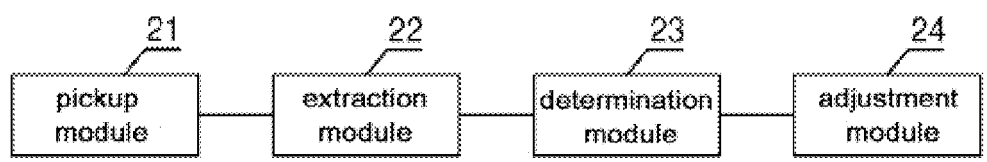
FIG. 3 is a schematic structural diagram of an apparatus for adjusting the volume of a head-mounted display device according to an embodiment of the present disclosure.

On the basis of the above embodiments, an embodiment of the present disclosure correspondingly provides an apparatus for adjusting the volume of a head-mounted display device. Referring to FIG. 3, the apparatus includes:
  a pickup module 21 configured to pick up a sound signal at an ear entrance position of a user;
  an extraction module 22 configured to acquire an environment sound signal from the sound signal according to the sound signal and a currently played audio signal;
  a determination module 23 configured to determine an output volume target value of a head-mounted display device according to the environment sound signal; and
  an adjustment module 24 configured to adjust the volume of the head-mounted display device according to the output volume target value.

Further, the determination module 23 includes:
  an acquisition unit configured to acquire an average amplitude of the environment sound signal within a preset duration; and
  a calculation unit configured to obtain the output volume target value according to the average amplitude and a preset relational expression, wherein:
  the preset relational expression is $\beta = b + \log_a(\alpha+1)$, wherein $\beta$ represents the output volume target value, b represents a currently played volume value of the head-mounted display device, a is a constant greater than 1, and $\alpha$ represents the average amplitude.

It should be noted that the present embodiment has the same beneficial effects as those of the above-mentioned method embodiment during use. The details of the method for adjusting the volume of a head-mounted display device involved in the present embodiment have been described in the above-mentioned embodiments, and will not be repeated here.

On the basis of the above embodiments, an embodiment of the present disclosure also provides a system for adjusting the volume of a head-mounted display device, the system includes:
  a memory for storing a computer program; and
  a processor configured to implement steps of the method for adjusting the volume of a head-mounted display device as described above when the computer program is executed.

It should be noted that in the embodiment, the processor can be specifically used to pick up a sound signal at an ear entrance position of a user, extract an environment sound signal from the sound signal according to the sound signal and a currently played audio signal, determine an output volume target value of a head-mounted display device according to the environment sound signal, and adjust the volume of the head-mounted display device according to the output volume target value.

The various embodiments in this specification are described in a parallel or progressive manner, and each embodiment focuses on the differences from other embodiments, and the same or similar parts between the various embodiments may be referred to each other. As for the device disclosed in the embodiment, since it corresponds to the method disclosed in the embodiment, the description is relatively simple. For relevant parts, please refer to the description of the method.

Those of ordinary skill in the art will understand that the units and algorithm steps of each example described in conjunction with the embodiments disclosed herein can be implemented by electronic hardware, computer software, or a combination thereof. In order to clearly explain the interchangeability of hardware and software, the composition and steps of each example have been generally described in the above description in terms of function. Whether these functions are performed in hardware or software depends on the specific application and design constraints of the technical solution. Those skilled in the art may implement the described functions for each specific application using different methods, but such implementations should not be considered beyond the scope of the present application.

The steps of the method or algorithm described in connection with the embodiments disclosed herein may be directly implemented by hardware, a software module executed by a processor, or a combination thereof. The software module may be disposed in a random access memory (RAM), a memory, a read only memory (ROM), an electrically programmable ROM, an electrically erasable programmable ROM, a register, a hard disk, a removable disk, a CD-ROM, or any other form of storage medium known in the art.

It should be noted that relational terms such as first and second described herein are only used to distinguish one entity or operation from another entity or operation, and do not necessarily require or imply any such actual relationship or order between these entities or operations. Moreover, terms such as "comprise", "include" or any other variation thereof are intended to encompass a non-exclusive inclusion such that a process, method, article or apparatus that includes a series of elements includes not only those elements, but also other elements not explicitly listed, or elements inherent to such a process, method, article or apparatus. Without further limitation, the element defined by the phrase "comprising a . . . " does not preclude the presence of additional identical elements in the process, method, article or apparatus including the element.

What is claimed is:

1. A method for adjusting volume of a head-mounted display device, comprising:
    picking up a sound signal at an ear entrance position of a user;
    acquiring an environment sound signal from the sound signal according to the sound signal and a currently played audio signal;
    determining an output volume target value of the head-mounted display device according to the environment sound signal; and
    adjusting the volume of the head-mounted display device according to the output volume target value,
    wherein the determining the output volume target value of the head-mounted display device according to the environment sound signal comprises:
        acquiring an average amplitude of the environment sound signal within a preset duration; and
        obtaining the output volume target value according to the average amplitude and a preset relational expression,
    wherein the preset relational expression is $\beta = b + \log_a(\alpha + 1)$, the $\beta$ represents the output volume target value, the b represents a currently played volume value of the head-mounted display device, the a is a constant greater than 1, and the $\alpha$ represents the average amplitude.

2. The method for adjusting volume of the head-mounted display device according to claim 1, wherein the $\alpha$ satisfies an accompanying sound power of the head-mounted display device.

3. The method for adjusting volume of the head-mounted display device according to claim 1, wherein the adjusting the volume of the head-mounted display device according to the output volume target value comprises:
    adjusting the volume of the head-mounted display device to gradually change from the currently played volume value to a target volume range, the target volume range being obtained according to the output volume target value.

4. The method for adjusting volume of the head-mounted display device according to claim 3, wherein the adjusting the volume of the head-mounted display device is performed so that it linearly changes from the currently played volume value to the target volume range.

5. The method for adjusting volume of the head-mounted display device according to claim 1, wherein the method further comprises: before determining the output volume target value of a head-mounted display device according to the environment sound signal,
    determining a magnitude of the environment sound according to the environment sound signal; and
    when the magnitude of the environment sound is greater than a preset value of the currently played volume value of the head-mounted display device, performing the step of determining the output volume target value of the head-mounted display device according to the environment sound signal.

6. A non-transitory computer-readable storage medium, wherein a computer program is stored on the computer-readable storage medium, and when the computer program is executed by a processor, steps of the method for adjusting volume of the head-mounted display device according to claim 1 are implemented.

7. The method for adjusting volume of the head-mounted display device according to claim 1, wherein the picking up the sound signal at the ear entrance position of the user comprises:
    receiving an automatic adjustment instruction input by the user; and one of:
    picking up, when the user listens to sound through a loudspeaker of the head-mounted display device, the sound signal at the ear entrance position of the user by a first microphone pre-set on the head-mounted display device at a position closer to a listening position; or
    picking up, when the user listens to sound through earphones of the head-mounted display device, the sound signal at the ear entrance position of the user by a second microphone disposed at a front end of the earphones.

8. The method for adjusting volume of the head-mounted display device according to claim 1, wherein the sound signal comprises the environment sound signal, and the sound signal, transmitted to the user's ear through earphones or a loudspeaker from the audio signal currently played by the head-mounted display device.

9. A system for adjusting volume of a head-mounted display device, comprising:

a memory having stored thereon a computer program for adjusting volume of a head-mounted display device; and a processor coupled to the memory and configured to execute the computer program, the computer program, when executed by the processor, to cause the processor to perform steps of:

picking up a sound signal at an ear entrance position of a user;

acquiring an environment sound signal from the sound signal according to the sound signal and a currently played audio signal;

determining an output volume target value of the head-mounted display device according to the environment sound signal; and adjusting the volume of the head-mounted display device according to the output volume target value, wherein the determining the output volume target value of the head-mounted display device according to the environment sound signal comprises:

acquiring an average amplitude of the environment sound signal within a preset duration; and obtaining the output volume target value according to the average amplitude and a preset relational expression, wherein the preset relational expression is $\beta = b + \log_a(\alpha+1)$, the $\beta$ represents the output volume target value, the b represents a currently played volume value of the head-mounted display device, the a is a constant greater than 1, and the $\alpha$ represents the average amplitude.

10. The system according to claim 9, wherein the $\alpha$ satisfies an accompanying sound power of the head-mounted display device.

11. The system according to claim 9, wherein the adjusting the volume of the head-mounted display device according to the output volume target value comprises:

adjusting the volume of the head-mounted display device to gradually change from the currently played volume value to a target volume range, the target volume range being obtained according to the output volume target value.

12. The system according to claim 11, wherein the adjusting the volume of the head-mounted display device is performed so that it linearly changes from the currently played volume value to the target volume range.

13. The system according to claim 9, the computer program to further cause the processor to perform steps of:
before determining the output volume target value of the head-mounted display device according to the environment sound signal, determining a magnitude of the environment sound according to the environment sound signal; and when the magnitude of the environment sound is greater than a preset value of the currently played volume value of the head-mounted display device, performing the step of determining the output volume target value of the head-mounted display device according to the environment sound signal.

14. The system according to claim 9, wherein the picking up the sound signal at the ear entrance position of the user comprises:

receiving an automatic adjustment instruction input by the user; and one of:

picking up, when the user listens to sound through a loudspeaker of the head-mounted display device, the sound signal at the ear entrance position of the user by a first microphone pre-set on the head-mounted display device at a position closer to a listening position; or picking up, when the user listens to sound through earphones of the head-mounted display device, the sound signal at the ear entrance position of the user by a second microphone disposed at a front end of the earphones.

15. The system according to claim 9, wherein the sound signal comprises an environment sound signal and a sound signal transmitted to the user's ear through earphones or a loudspeaker from an audio signal currently played by the head-mounted display device.

* * * * *